March 21, 1961 R. S. HAYES, JR 2,975,861
SEAL FOR A ROTATING ELIMINATING DEVICE
Filed May 1, 1957

INVENTOR.
RICHMOND S. HAYES, JR.
BY
*Herman Seid*
ATTORNEY.

United States Patent Office 2,975,861
Patented Mar. 21, 1961

2,975,861

SEAL FOR A ROTATING ELIMINATING DEVICE

Richmond S. Hayes, Jr., De Witt, N.Y., assignor to Carrier Corporation, Syracuse, N.Y., a corporation of Delaware Filed May 1, 1957, Ser. No. 656,368

4 Claims. (Cl. 183—24)

This application relates to a seal and more particularly to a seal for use with a rotating eliminating device.

In the copending application of Ernest C. Hungate, Ser. No. 575,560, filed April 2, 1956, now Patent No. 2,932,360, relating to "Apparatus for Treating Air," there is disclosed a device used for air conditioning textile mills. Essentially, the device consists of a means for passing air through the apparatus or air washer, means for spraying water into the air stream as it passes through the air washer, and means for eliminating water and lint particles from the air as it leaves the washer. The last mentioned eliminator means comprises a journaled rotor having a plurality of blades defining a plurality of paths of changing direction. These blades are enveloped by a cylindrical or conical enclosing means. In operation, the eliminator structure rotates as a result of the reactive force of the air passing therethrough. In some cases a motor drive is used. The air passing through the washer is substantially saturated and water and lint particles reaching the eliminator impinge against the eliminator structure and are returned to the washer.

As can be appreciated, air passing through a plurality of rotating paths of changing direction, will experience a considerable pressure drop. In many cases, where the air flow is utilized to rotate the eliminator structure, this added dissipation of energy will also result in a further pressure drop in the air passing through the structure. This pressure drop in certain instances may be equivalent to as much as a few inches of water.

In view of the considerable pressure difference existing between the entrance side and the exit side of the eliminator structure, there is natural tendency of the air to bypass the eliminator in leaving the washer. A seal is obviously necessary between the rotating eliminator structure and the casing of the washer. Considering that these eliminator structures may be five and six feet in diameter, the problem to create an effective, light weight sheet metal seal is great.

The chief object of the present invention is to provide an inexpensive sheet metal seal for a rotating eliminator structure.

Another object is to provide a seal that will remove liquid particles from the air stream passing through the seal structure and return these particles to the washer.

A still further object is to provide a seal which will limit the amount of air passing therethrough and further contain means for removing the water from any air which is admitted therethrough and return the water to the air washer. These and other objects of the invention will become more apparent from the following description.

This invention relates to a seal for a rotating eliminator structure located between the washing area of the air washer and the exit of the air washer. The seal comprises stationary and rotating elements which define a first annular chamber in communication with the washing section of the washer by means of an annular constriction, said stationary and rotating elements of the seal further defining a second chamber connected by a second annular constriction to the first chamber, the second chamber in communication with the exit of the washer and the stationary and rotating elements of the seal are so arranged whereby water collected within this seal will drain back into the washing section of the washer.

The attached drawings illustrate a preferred embodiment of the invention, in which.

Figure 1:
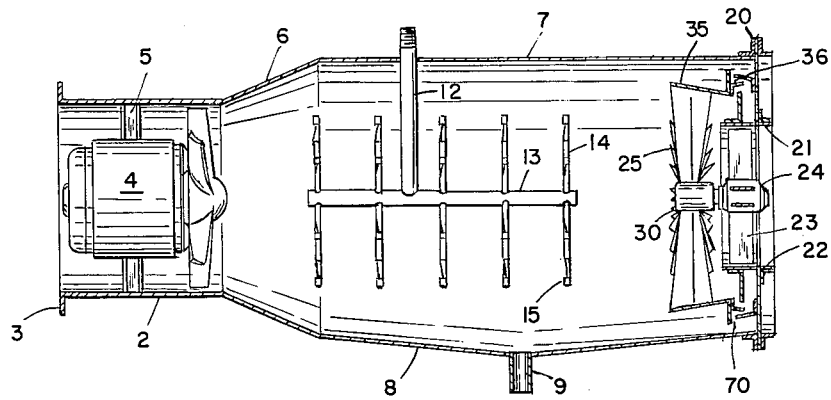
Figure 1 is a view of a washer in section utilizing the present invention.

Referring to Figure 1, there is shown an air washer having a flanged cylindrical section 2. The flanged section of this cylindrical section 2 is adapted to be connected to a mixing chamber (not shown) into which return and outside air are introduced. Located within this cylindrical section is an axial fan having suitable struts 5 adapted to concentrically mount the fan within the cylindrical section 2. Following the section 2 there is the transition section 6, which has a general conical shape. This transition section 6 is followed by a substantially cylindrical section 7 having a suitable sump 8 with a drain line 9.

Located within this cylindrical section 7 of the washer is a supply line 12, which connects to a header 13, having extending therefrom a plurality of branch lines 14. The end of each of the branch lines 14 is provided with suitable spray nozzle 15.

Following the spray section of the washer there is located a flanged connection 20 having a smaller circular opening 21 defined by the cylindrical section 22 which extends into the washer shell 7. A plurality of struts 23 are located within section 22 to concentrically support a bearing 24 from whence is supported the rotating eliminator structure 25.

This eliminator structure may be of a design similar to that illustrated in the copending Hungate application. Basically, this eliminator comprises a plurality of blades, radially extending from a hub 30. These blades 31 comprise a plurality of planar members which define a plurality of passages of changing direction through the eliminator structure. The entire eliminator blade structure is enveloped by enclosing means 35. Located between the enclosing means 35 and the end of the washer is a suitable seal 36 which will be described more fully hereinafter.

Considering the basic operation of the washer, return and outside air are mixed in suitable quantities in a mixing chamber (not shown), and introduced into the cylindrical section 2 through the flanged opening 3 of the washer. The air is induced through the washer structure by the axial fan 4 which passes the air at a substantial velocity to the transition piece 6 into the washer section 7. As previously mentioned, this section is provided with a suitable header system and branch lines having suitable spray nozzles for wetting the air as it passes through the washer. Water is passed through the header 12 into the supply header 13 and the water passes from the supply header into the various branch lines 14 to the spray nozzles 15 which create a heavy spray of water within the washing section.

Air passing through this water spray may be substantially saturated. The air, because of its high velocity and because of the nature of the spray, will tend to carry therewith droplets of water and other foreign particles. These particles will encounter the eliminator structure 25 which as previously mentioned comprises a plurality of rotating paths of changing direction. Because of the geometry of the blade structure, the reaction of the air stream passing through the washer has a reactive force against the eliminator structure tending to rotate the eliminator 25 in the bearing 24. This rotating motion of the eliminator causes droplets of water and other particles to receive the effects of the centrifugal force whereby these particles tend to collect on the enclosing means 35. Because of the conical nature of this enclosing means, these droplets and particles will return to the sump 8 from where the water is passed through the drain 9 to a suitable filtering system (not shown) to be recirculated. The air that passes through the eliminator structure 25 will experience a pressure drop of approximately a few inches of water. The air enters the circular opening 21 as defined by the cylindrical member 22 and passes to the area to be conditioned.

As can be apreciated, because of the pressure difference existing between the entrance and exit sides of the eliminator structure, there will be a tendency of the air to circumvent this resistance to air travel by trying to pass between the rotating eliminator and the casing. To avoid this condition, a suitable seal 36 is provided.

As previously mentioned, a problem arises in making an operative seal. To have a low cost unit it is extremely desirable to have an eliminator structure which is driven by the air stream passing therethrough. For this reason an inexpensive sheet metal construction is used. This eliminator structure ranges in size up to six feet in diameter. If clearances on the seal are extremely critical it can be readily appreciated that such a seal could be subject to high costs. A seal construction is needed which can be fabricated of sheet metal without critical clearances being needed for satisfactory performance.

Figure 2:
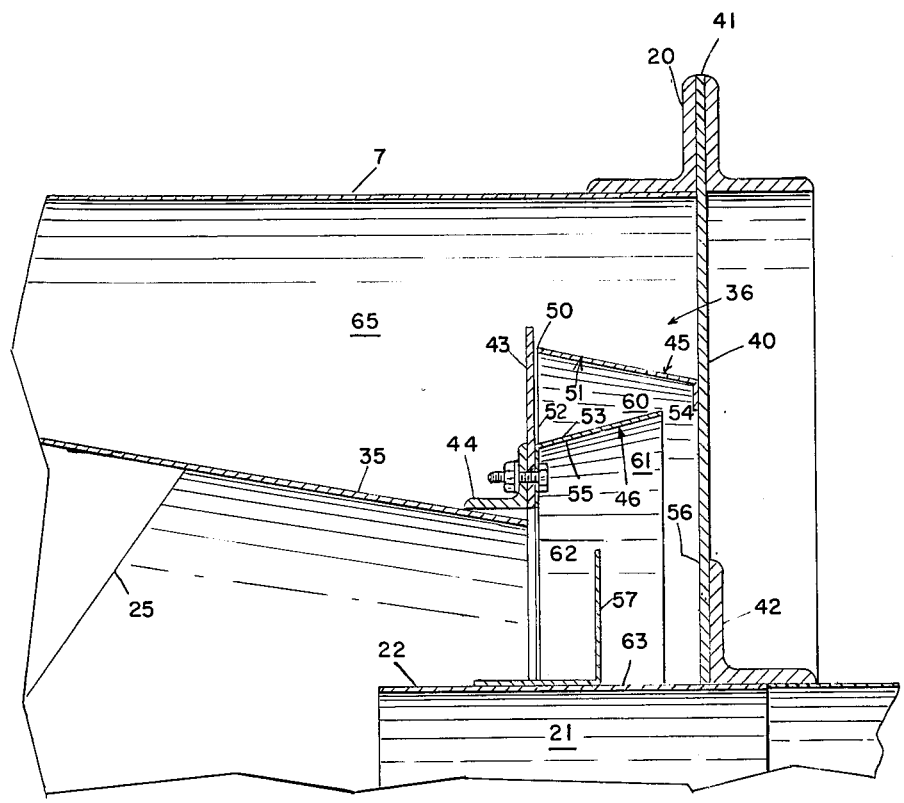
Figure 2 is a fragmentary view in section of the seal comprising the present invention.

Referring to Figure 2, there is shown an enlarged sectional view of the present invention comprising the seal for the washer. The washer shell 7 terminates at the angle member 20 which is adjacent the opposed angle member 41; these angles 20 and 41 having located therebetween the end plate 40 of the washer. Extending through this end plate is the previously mentioned cylindrical member 22 which defines the exit opening 21 from the washer itself.

Located adjacent this exit is the eliminator 25 with the enclosing means 35 which has the shape of a truncated conical surface. Attached to this member 35 is the angle member 44 which has attached thereto the planar annular member 43. This annular member rotates with the eliminator structure. Adjacent the angle member 44 and bolted to the planar member 43 is the conical member 46 which also rotates with the eliminator structure.

Associated with the end plate member 40 is the conical member 45 and the baffle member 57 which is mounted about the cylindrical member 22 within the washer and constitutes a part of the present invention. The conical member 45 is so spaced from the annular planar member 43 as to form a circular or annular constriction 50. The surface 51 of the member 45 and the surface 53 of the member 46 with the surface 52 of the member 43 substantially define a first chamber 60 which is in communication with the washing section of the washer.

The conical member 45 and the conical member 46 tend to converge; however, they are separated by the space 54. The surface 56 of the member 40 and the surface 55 of the conical member 46 with the baffle member 57 substantially form a second chamber 61 which is in communication with the first chamber 60 by means of the annular constriction previously noted as being the annular space 54. This second chamber is in communication with the exit 21 of the washer by means of the annular constriction 62 which is located between the tip of the member 57 and the inner edge of the annular planar member 43.

During operation of the washer as described above, because of the pressure difference existing between the inlet and exit sides of the eliminator blade structure 25, there is a tendency of the air within the washer to avoid the resistance created by the eliminator structure by circumventing the entire eliminator structure. In order to prevent any entrained liquid particles from bypassing this eliminator structure the present seal 36 is utilized. This seal, as has been noted, comprises a plurality of constrictions which are combined with a plurality of chambers so that the air stream is throttled as it passes through the constrictions and is expanded in these chambers to substantially remove liquid particles from the leakage air stream. Specifically by this process, the velocity of the air passing through the seal is constantly increased and decreased and during each decrease the entrained water particles in the air are caused to form on the various surfaces of the seal structure and to be ultimately passed back into the sump 8 of the washer.

Considering the operation of the invention as illustrated in Figure 2, air which is in the washer section 65 of the air washer because of its higher pressure will tend to pass through the eliminator or through the seal structure. Because of the plurality of spray nozzles as previously noted, this air will contain a great number of entrained water particles. As the air attempts to pass through the seal, it first encounters the annular constriction 50 which consists of a gap of approximately ¼″ or less. This will greatly throttle the air passing through the seal and limit the amount of water which will enter the seal structure itself. As this air passes into the seal through this annular constriction 50, it encounters the first chamber 60 wherein the velocity of the air is greatly diminished and the water particles will tend to collect on the stationary surface 51 or the rotating surface 53 in which case the rotation of the eliminator will cause the water droplets collected on the surface 53 to be urged outwardly by centrifugal force and passed into the air stream wherein most of the water particles will then land on the surface 51 of the stationary member 45. Some droplets will also form on the surface 52 of the annular planar member 43 and centrifugal force will urge this water to pass through the constriction 50.

The air in the chamber 60 will then pass through the less critical constriction 54. This constriction further comprises a substantial change in direction for the air stream and the inertia effect on water droplets passing through this constriction 54 will cause the particles of water to either land on the surface 56 of the member 40 or pass onto the surface 51 of the conical member 45.

The air passing through the constriction 54 will enter into the second chamber 61 where it will undergo a substantial diminishment in velocity. Any remaining air droplets will again tend to fall out and land on the surface 55 of the conical member 46 which is a rotating member and on the stationary surface 56 of the end plate member 40. Other particles of water will tend to fall on the surface of the planar member 57 and on the surface 63 of the cylindrical member 22. The air will continue and pass through the less critical constriction 62 and pass in a direction opposing the passage of air through the eliminator section 25, make a complete 180° turn so as to enter the exit opening 21 of the washer as defined by the cylindrical member 22.

At this point, any water particles which have passed through the third constriction 62 may encounter the inner surface of the enclosing means 35 and because of the expanding diameter of this conical member toward the air washer section, centrifugal force will urge the water to pass back into the washer. Particles of water which land on the surface 55 of the rotating conical member 46 will be urged outwardly along the surface and the drops of water will form on the edge of the conical member 46 in the area of the annular constriction 54 and these droplets, because of the centrifugal force will bridge this constrictive gap and land on the surface 51 of the stationary conical member 45. As a result, any water particles which land on the rotating conical surface 55 or the rotating planar surface 52 will tend to pass back into the washer by ultimately passing through the constriction 50. In the case of water patricles landing on the surface 51, the effect of gravity will be such that all the water on the surface 56 and surface 51 will tend to drain to the bottom portion of the eliminator seal (at point 70 in Figure 1) and ultimately drain into the sump 8 of the washer and drain through the opening 9 from the washer itself.

From the above description of the operation of the invention, it will be noted that the air has passed through a first constriction which is a critical constriction being of small physical size so as to drastically limit the amount of air and accompanying liquid admitted through the seal structure itself. This air is then passed into a first chamber wherein the velocity of the air is greatly reduced causing water droplets to settle out of the air stream. Should these particles of water land on a rotating member, they are urged outwardly by the centrifugal force created by the rotation of the rotating member so as to fall on a stationary member or to pass directly through the first annular constriction. In the event that a water particle falls on a stationary member in this first chamber the tendency is to drain the water from the seal by means of gravity. The air is then passed from the first chamber through a second constriction wherein the velocity of the air is increased slightly; however, this air further experiences a severe change in the direction causing any remaining droplets of water to collect on the inner surface of the back plate of the washer. Here again, any droplets forming on this member or on the baffle member 57 will tend to drain out of the seal structure at the point 70 shown in Figure 1.

As the air passes through the second constriction 54, it passes into a second chamber 61. In this second chamber 61, should the water fall on a rotating surface, it will be under the influence of centrifugal force and tend to drain on the surface 51 and drain out of the system with the water that previously fell on other stationary elements. The air is then passed through a third constriction where the velocity again increases. However, at this point, the air is passing in a direction directly opposing the air passing through the eliminating structure 25. As can be appreciated, the air passing through the seal structure has experienced a severe loss in pressure as a result of the alternate throttling and expansion of the air passing therethrough. At this point the air passing through the eliminator strucure 25 will have a greaer velocity than the air passing through the seal and being of opposite direction will severely discourage any air from rapidly being passed into the exit 21. It will be also noted that air after it has passed through the constriction 62, will be subject to a complete 180° turn in order to pass to the exit 21.

From the above description it is noted that a seal has been provided which is inexpensive and highly effective because of the orientation elements which create a constant throttling and diminishment in air velocity accompanied by a number of severe changes in direction so that any droplets of water in the air passing through the washer will be taken from the air stream and returned to the washer structure itself thereby assuring that the eliminator action of the rotor structure will not be frustrated by severe leakage through the seal structure. It will be further noted that the present invention is highly compact and inexpensive because of its construction and it will be noted that the compactness is a result of the chamber orientation wherein the first and second chambers are concentric and the first chamber envelops the second chamber.

While I have described the preferred embodiment of my invention, it will be understood that the invention is not limited thereto, since it may be otherwise embodied within the scope of the following claims.

I claim:

1. In a seal arrangement between a rotating structure and a stationary structure, a seal comprising a first rotatable member, a first stationary member, said first rotatable member and said first stationary member being parallel and in spaced relationship, a second stationary member extending nearly across the space between the first rotatable member and the first stationary member, a second rotatable member extending in the space between the first rotatable member and the first stationary member, said first and second rotatable members and said second stationary member substantially defining a first annular chamber; said first rotatable member and said second stationary member defining a first annular constriction extending radially outwardly from and in communication with the first chamber whereby air passing through the annular constriction is severly limited and is then expanded within the first chamber resulting in water particles in the air stream leaving the air stream and passing onto the various members defining the first chamber; the second rotatable member and the second stationary member having general conical shapes; an annular baffle member which with the first and second rotatable members and the first stationary member substantially define a second chamber, said second chamber being in communication with the first chamber; an annular constriction between the first and second chambers formed by the second rotatable and first stationary members, the first annular chamber surrounding annularly the second annular chamber, the annular baffle member and the first rotatable member defining a third annular constriction, said second chamber being in communication with the third annular constriction.

2. In a seal arrangement placed between a rotatable water eliminator and a stationary casing member, an air stream carrying droplets of water being directed in a predetermined direction through the eliminator to remove the droplets, some portion of the air stream bypassing the eliminator and bleeding through the seal arrangement in a predetermined path involving abrupt changes in direction to eliminate any droplets carried thereby, a seal comprising a first rotatable member, a first stationary member, said first rotatable member and said first stationary member being parallel and in spaced relationship, a second stationary member extending nearly across the space between the first rotatable member and the first stationary member, a second rotatable member extending in the space between the first rotatable member and the first stationary member, said first and second rotatable members and said second stationary member substantially defining a first annular chamber through which air passes in a direction substantially parallel to the direction of the air stream through the eliminator, said first rotatable member and said second stationary member defining a first annular constriction extending radially outwardly from and in communication with the first chamber whereby air bleeding into the first chamber is severely limited and subject to an abrupt change in direction in the first chamber resulting in water particles in the air stream leaving the air stream and passing onto the various members defining the first chamber, an annular baffle member which with the first and second rotatable members and the first stationary member substantially define a second chamber in communication with the first chamber through a second annular constriction and in communication with the air stream through an opening after its passage through the eliminator, the second rotatable and first stationary members forming the annular constriction between the first and second chambers, air passing from the first chamber to the second chamber being subject to an abrupt change in direction during such passage and flowing through the second chamber in a direction opposite its direction through the first chamber, air discharged from the second chamber changing direction of flow to join the air stream after its passage through the eliminator.

3. In an air washer, the combination of a casing having an inlet and an outlet, means for drawing an air stream through the inlet in the casing, passing the air stream through said casing in a predetermined direction and discharging the air stream from the casing outlet, means for spraying water in the air stream as it passes through the casing, a rotatable eliminator in the casing to remove entrained water particles from the air stream passing through the casing, a seal placed between the eliminator and the casing outlet to eliminate water particles from any portion of the air stream bypassing the eliminator, said seal comprising a first rotatable member, a first stationary member, said first rotatable member and said first stationary member being parallel and in spaced relationship, a second stationary member extending nearly across the space between the first rotatable member and the first stationary member, a second rotatable member extending in the space between the first rotatable member and the first stationary member, said first and second rotatable members and said second stationary member substantially defining a first annular chamber through which air passes in a direction substantially parallel to the direction of the air stream through the eliminator, said first rotatable member and said second stationary member defining a first annular constriction extending radially outwardly, from and in communication with the first chamber whereby air bleeding into the first chamber is severely limited and subject to an abrupt change in direction in the first chamber resulting in water particles in the air stream leaving the air stream and passing onto the various members defining the first chamber, an annular baffle member which with the first and second rotatable members and the first stationary member substantially define a second chamber in communication with the first chamber through a second annular constriction and in communication with the air stream through an opening, after its passage through the eliminator, the second rotatable and first stationary members forming the annular constriction between the first and second chambers, air passing from the first chamber to the second chamber being subject to an abrupt change in direction during such passage and flowing through the second chamber in a direction opposite its direction through the first chamber, air discharged from the second chamber changing direction of flow to join the air stream after its passage through the eliminator.

4. In a seal arrangement placed between a rotatable water eliminator and a stationary casing member, an air stream carrying droplets of water being directed in a predetermined direction through the eliminator to remove the droplets, some portion of the air stream bypassing the eliminator and bleeding through the seal arrangement in a predetermined path involving abrupt changes in direction to eliminate any droplets carried thereby, a seal comprising a first rotatable member, a first stationary member, said first rotatable member and said first stationary member being parallel and in spaced relationship, a second stationary member extending nearly across the space between the first rotatable member and the first stationary member, a second rotatable member extending in the space between the first rotatable member and the first stationary member, said first and second rotatable members and said second stationary member substantially defining a first annular chamber through which air passes in a direction substantially parallel to the direction of the air stream through the eliminator, said first rotatable member and said second stationary membed defining a first annular constriction extending radially outwardly from and in communication with the first chamber whereby air bleeding into the first chamber is severely limited and subject to an abrupt change in direction in the first chamber resulting in water particles in the air stream leaving the air stream and passing onto the various members defining the first chamber, an annular baffle member which with the first and second rotatable members and the first stationary member substantially define a second chamber in communication with the first chamber through a second annular constriction and in communication with the air stream after its passage through the eliminator, the second rotatable and first stationary members forming the annular constriction between the first and second chambers, the annular baffle member and the first rotatable member defining a third constriction adjacent the outlet of the second chamber, air discharged through the third constriction changing its direction of flow to join the air stream after its passage through the eliminator.

References Cited in the file of this patent

UNITED STATES PATENTS

| | | |
|---|---|---|
| 1,186,208 | Kent et al. | June 6, 1916 |
| 1,511,834 | Marien | Oct. 14, 1924 |
| 1,898,807 | Barnes | Feb. 21, 1933 |
| 1,998,492 | Christensen | Apr. 23, 1935 |
| 2,244,165 | MacFarland et al. | June 3, 1941 |

FOREIGN PATENTS

| | | |
|---|---|---|
| 4,489 | Great Britain | July 27, 1911 |
| 526,031 | Great Britain | Sept. 10, 1940 |
| 686,318 | Great Britain | Jan. 21, 1953 |
| 130,295 | Sweden | Dec. 12, 1950 |

UNITED STATES PATENT OFFICE
CERTIFICATE OF CORRECTION

Patent No. 2,975,861            March 21, 1961

Richmond S. Hayes, Jr.

It is hereby certified that error appears in the above numbered patent requiring correction and that the said Letters Patent should read as corrected below.

Column 5, line 45, for "strucure" read -- structure --; same line 45, for "greaer" read -- greater --; column 6, line 13, for "severly" read -- severely --; column 8, line 15, for "membed" read -- member --.

Signed and sealed this 26th day of September 1961.

(SEAL)
Attest:

ERNEST W. SWIDER            DAVID L. LADD
Attesting Officer            Commissioner of Patents

USCOMM-DC